United States Patent [19]

Derman

[11] Patent Number: 4,640,106
[45] Date of Patent: Feb. 3, 1987

[54] DEVICE FOR PREVENTING UNAUTHORIZED USE OF A CASSETTE TAPE DECK

[75] Inventor: Jay S. Derman, Redondo Beach, Calif.

[73] Assignee: Z-Lock Company, Inc., Redondo Beach, Calif.

[21] Appl. No.: 698,313

[22] Filed: Feb. 5, 1985

[51] Int. Cl.⁴ .............................................. E05B 73/00
[52] U.S. Cl. ............................................. 70/14; 70/58
[58] Field of Search .................. 70/14, 57, 58, 158, 70/163, 164, 166–173

[56] References Cited

U.S. PATENT DOCUMENTS 4,131,001 12/1978 Gotto ........................................ 70/14
4,527,405 7/1985 Renick ..................................... 70/14

*Primary Examiner*—Robert L. Wolfe
*Attorney, Agent, or Firm*—Poms, Smith, Lande & Rose

[57] ABSTRACT

A device for inhibiting use of a cassette deck having a cassette chamber accessible through a chamber opening in which the device includes an elongated flat body member having a length, width and thickness adapted to be received within the chamber through the opening, a transverse member at one end of the body member having a dimension greater than the corresponding dimension of the chamber opening to limit movement of the body member into the chamber, a lock element mounted and positioned within an opening in the body member and movable to one position to permit insertion of the body member into the cassette chamber and movable to another position to restrict outward movement of the body member; the lock element being adjustably positioned along a threaded member in the body member opening to a selected position therealong.

7 Claims, 6 Drawing Figures

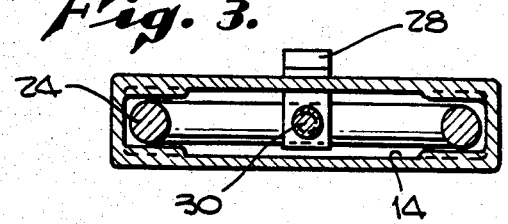
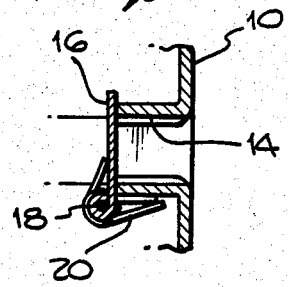
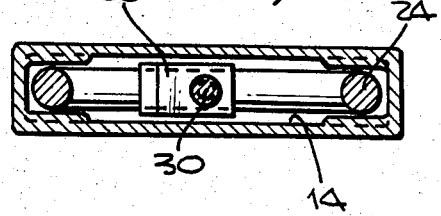
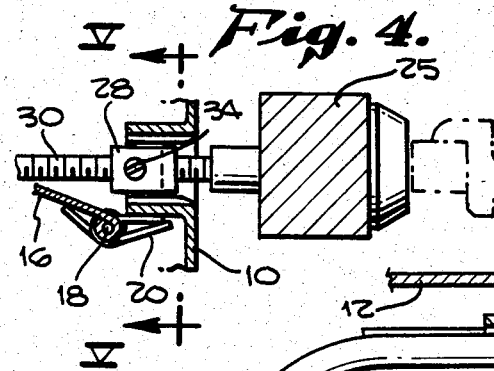
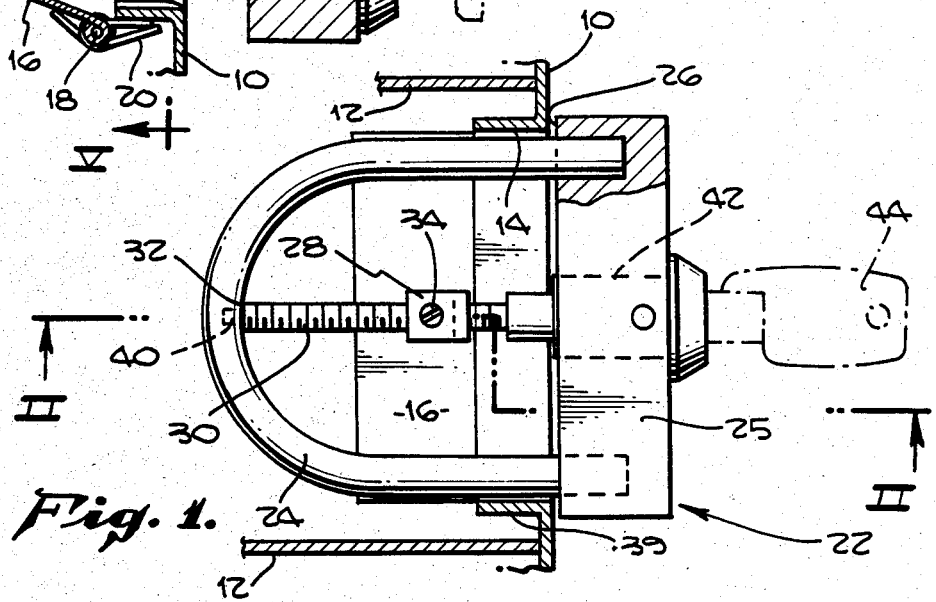
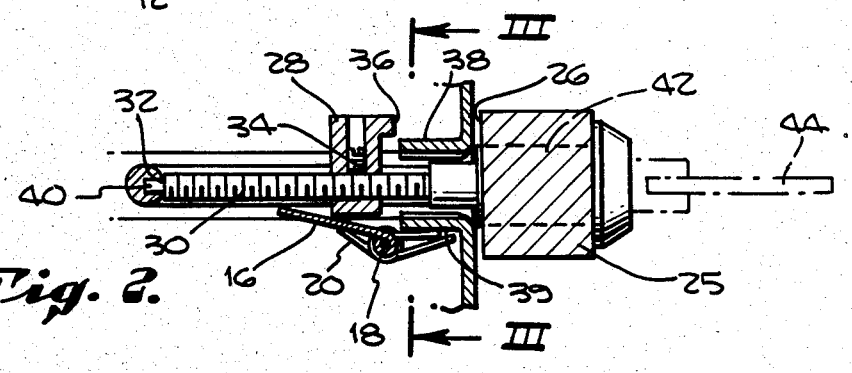

DEVICE FOR PREVENTING UNAUTHORIZED USE OF A CASSETTE TAPE DECK

BACKGROUND OF THE INVENTION

Automobile tape deck and associated radio and stereo equipment are continually subject to theft during which the entire radio and audio system may be removed from the vehicle or certain separable component parts thereof may be removed such as a separately mounted and accessible cassette tape deck. Many anti-theft devices have been proposed which usually include means for locking the unit in the dashboard of the car, such locking devices being usually externally mounted of the unit being secured.

An example of such a prior proposed locking device is shown in U.S. Pat. No. 4,066,307 in which a housing encloses the communication unit, the housing providing a concealed limited llmited access keyway for locking the equipment in the dashboard of the vehicle. Another example is shown in U.S. Pat. No. 2,662,975 in which a radio device is received within a chamber in the dashboard and a locking element is provided on the dash above the radio receiving chamber for interposing a locking element between the dashboard and the radio equipment to prevent withdrawal of the radio equipment chamber. Usually in such prior proposed devices the anti-theft means was successfully avoided and the equipment removed from the automobile. Such equipment was in operable condition and could be readily sold or used.

SUMMARY OF THE INVENTION

The present invention relates to a device for preventing use of a tape deck and which serves as a deterrent to theft of the tape deck from the vehicle. The proposed device of the present invention does not protect against removal of the tape deck from an automobile. The purpose of the device of the present invention is to prevent or inhibit use of deck in or out of the vehicle. If removed, a tape deck provided with the device of this invention is not usable without damage thereto and therefore is not readily marketed or salable. The likelihood of a tape deck being stolen is therefore substantially reduced and the device effectively acts as a theft deterrent.

The primary object of the present invention therefore is to provide a device to inhibit and deter theft thereof by preventing use of the device unless the anti-theft device is removed by authorized means, the tape deck being subject to damage by unauthorized removal of the device.

An object of the invention is to provide a theft deterrent device which may be readily installed, readily removed by an authorized person and which acts as a warning to a thief that the device is not readily usable either in or out of the vehicle.

Another object of the invention is to provide a device having an external transverse member which serves to prevent access to the cassette receiving chamber, to inhibit removal of the device, and to limit inward movement of the device when being installed.

A further object of the invention is to provide a device of the character described above in which a locking element is adjustable to facilitate selective engagement with internal parts of the cassette chamber to resist outward movement thereof and to prevent withdrawal.

A further object of the invention is to provide a device for detering theft of a cassette deck, the device being inexpensive to manufacture, virtually fool proof in operation, and may be made tamper resistant by utilizing metals such as case-hardened steel.

A further object of the invention is to provide a device for detering theft of a tape deck in a vehicle in which the device is readily insertable in the cassette receiving chamber and is provided with a locking element which may be readily adjusted to properly engage and cooperate with internal parts of a cassette chamber.

Various other objects and advantages of the present invention will be readily apparent from the following description of the drawings in which an exemplary embodiment of the invention is shown.

FIG. 1 is a plan view partly in section of an anti-theft deterent device embodying this invention and shown in operable position within a cassette receiving chamber which is only partially shown.

FIG. 2 is a fragmentary section view taken in the plane indicated by line II—II of FIG. 1.

FIG. 3 is a sectional view taken in the plane indicated by line III—III of FIG. 2, the device being in locked position.

FIG. 4 is a fragmentary sectional view taken in the same plane as that of FIG. 2 and indicating the device being inserted into or removed from the cassette chamber.

FIG. 5 is a fragmentary sectional view taken in the plane indicated by line III—III and showing the position of the lock element during removal as shown in FIG. 4.

FIG. 6 is a fragmentary sectional view of the cassette chamber opening with the device removed and chamber door biased into closed position.

DETAILED DESCRIPTION OF THE INVENTION

Tape decks for which the present device is useful include automobile tape decks mounted in the dashboard of a vehicle, such tape decks including both 8-track cartridge type and cassette type. While the example of this invention is described with respect to an automobil cassette type decktape it will be understood that the device may be used with any type of tape deck not for vehicle use and which includes a cassette or cartridge receiving chamber. Such chambers normally include a biased and hinged door to close the chamber opening when not in use to prevent entrance of dust and other foreign particles. In the example of a cassette deck described hereafter it will be understood that the longitudinal dimension of a cartridge is normally positioned for in and out movement relative to the cartridge chamber. The device may be modified for use when the width or length of the cartridge or cassette is the cooresponding dimension of the cassette or cartridge chamber opening.

In the example of the invention shown in FIG. 1 a cassette housing is provided with a chamber 12 provided with a chamber cassette receiving opening 14. Chamber opening 14 may be provided with a hinged chamber door 16 pivoted about an axis 18 and biased into closed position by a suitable spring 20.

The device of this invention is generally indicated at 22. Device 22 includes a body member 24 which, in this example, may comprise a U-shaped bolt made of suitable steel material. The width of the bolt is approximately the width of the chamber opening 14 to permit the bolt to be admitted through the opening with only slight tolerance to prevent lateral play. Opposite ends of the bolt are interconnected by a transverse member 24 which may comprise a bar of metal or rigid plastic material. The transverse member member 24 has a width and heighth greater than the dimensions of opening 14 so as to provide a means for limiting inward movement of the body member into the chamber by abutment with the marginal edge surfaces at the opening 14 as at 26.

Means to limit outward movement of the body member after it has been inserted into the chamber opening may comprise a pivotally movable lock element 28 carried on a threaded shaft 30 which extends from the center of the U-bolt at 32 to the transverse member 24 and is generally on the longitudinal axis of body member 24. The lock element 28 is provided with a screw 34 which may be tightened after the longitudinal position of the lock element on the thread shaft 30 is determined. As seen in FIG. 2 the lock element 28 is in upright position to prevent withdrawal of the body member 24 and may include a lip 36 which will engage an internal edge portion 38 of an inwardly directed flange 39 defining the opening 14.

Threaded shaft 30 is rotatable about its axis by a pin mounting at 40 and by a cylindrical mounting at 42 in the transverse member 25. The cylindrical mounting at 42 includes a cylinder type key lock means, which when a key such as 44 is inserted therein, may be turned to rotate shaft 30 through 90 degrees to move the lock element 28 from a non-interfering position to permit insertion or removal of the device as shown in FIG. 5 to a locking or interferring position to prevent removal of the device as shown in FIG. 3.

Since the device 22 occupies substantial space within cassette chamber 12 and when installed is not removable except by means of a suitable key 44, it will be apparent that upon removal of the tape cassette deck from the dashboard or from the property of the lawful owner the device 22 will interfere with and prevent use of the tape deck and therefore deter theft of the tape deck because the tape deck cannot be used.

Various modifications and changes may be made in the device shown and described hereinabove and all such changes and modifications coming within the scope of the appended claims embraced thereby.

I claim:

1. In a device for inhibiting use of a cassette tape deck having a cassette tape chamber accessible through a chamber opening, the combination of:
    a U-shaped member having a length, width and thickness adapted to be received within said chamber through said opening;
    a transverse member connecting ends of said U-member and having at least one dimension greater than the corresponding dimension of said chamber opening to limit movement of the U-shaped member into the chamber;
    a lock element connected with said U-shaped member;
    means for adjusting the position of the lock element within the chamber for restricting outward movement of the device and adapted to engage tape deck means within said chamber;
    and lock means for changing the position of the lock element to release the U-shaped member for withdrawal thereof from said chamber;
    said lock means being carried on the transverse member;
    said adjustable means includes a threaded member extending in an in and out direction with respect to said chamber, said threaded member connecting said transverse member and said U-shaped member;
    said lock element having threaded connection with said threaded member for adjusting said lock element to a selected position along said threaded member.

2. A device as claimed in claim 1 wherein
    said lock means is operatively connected to said threaded member for changing the position of the lock element within the chamber to lock and unlocked positions.

3. A device for preventing use of a cassette tape deck having a cassette tape chamber accessible through a chamber opening, comprising:
    an elongated flat body member defining a planar zone adapted to be inserted through said chamber opening and having a body member opening extending along an inwardly directed axis of said body member;
    first means at one end of said body member adapted to limit inward movement of the body member into said chamber;
    second means including a lock element in said body member opening spaced inwardly from said first means and transverse to said axis;
    said lock element in said body member opening having one position within said planar zone for entry and withdrawal of the body member with respect to said chamber opening and for turning movement of said transverse lock element about said axis to a second position in which said lock element projects exteriorly of said planar zone to prevent withdrawal of said body member from said chamber by engagement of the lock element with internal edge portions of said chamber opening;
    and means carried by said first means and extending inwardly thereof for moving said transverse lock element in said body member opening into and out of said first and second positions.

4. A device for preventing use of a cassette tape deck having a cassette tape chamber accessible through an opening, comprising:
    an elongated flat body member defining a planar zone adapted to be inserted through said opening;
    first means at one end of said body member adapted to limit inward movement of the body member into said chamber;
    second means including a lock element positionable externally of said zone and carried on said body member centrally of said body member adapted to prevent withdrawal of said body member from said chamber by engagement with means within said chamber;
    means carried by said first means and extending inwardly thereof for positioning said lock element within said zone to permit withdrawal of said body member from said chamber;
    and adjustable means for selectively positioning said lock element on said body member within said chamber.

5. In a device for inhibiting use of a cassette tape deck having a cassette tape chamber accessible through a chamber opening, the combination of:

a body member having a length, width, and thickness for reception within said chamber through said opening;

means at one end of said body member limiting movement of the body member into said chamber;

said body member having an elongated opening extending from said limiting means;

a lock element in said body member opening;

means for mounting and positioning said lock element within the thickness dimension of the body member for insertion and withdrawal of the body member from the cassette chamber and opening, and for moving the lock element to a position projecting from the thickness dimension of the body member for engagement with interior portions of the cassette chamber to lock and prevent withdrawal of the body member from the chamber and opening;

accessible lock means on said limiting means connected with said mounting and positioning means of said lock element for actuation of the lock element into said positions;

and means on said mounting and positioning means for adjusting the lock element along the positioning means.

6. A device as claimed in claim 5 wherein said adjusting means includes a threaded portion on said mounting and positioning means for moving said lock element to a selected position.

7. A device as claimed in claim 5 wherein said means for mounting and positioning said lock element includes a threaded portion;

said lock element being operatively connected to said threaded portion for adjustment to a selected position along said mounting and positioning means.

* * * * *